(12) United States Patent
Ninomiya (10) Patent No.: US 6,543,008 B1
(45) Date of Patent: Apr. 1, 2003

(54) COMPUTER SYSTEM AND PROGRAM REWRITING METHOD

(75) Inventor: Ryoji Ninomiya, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/303,552

(22) Filed: May 3, 1999

(30) Foreign Application Priority Data

Jun. 19, 1998 (JP) .......................................... 10-172983

(51) Int. Cl.[7] ................................................ G06F 11/00
(52) U.S. Cl. ......................................... 714/42; 710/15
(58) Field of Search .............................. 714/42, 43, 44, 714/36, 47, 39, 41, 22; 710/8, 10, 15, 18, 19

(56) References Cited

U.S. PATENT DOCUMENTS

| | | | |
|---|---|---|---|
| 5,197,034 A | | 3/1993 | Fandrich et al. |
| 5,546,589 A | * | 8/1996 | Odaira ........................ 395/570 |
| 5,565,957 A | * | 10/1996 | Goto ............................ 396/48 |
| 5,678,082 A | | 10/1997 | Miyazawa et al. |
| 5,845,332 A | * | 12/1998 | Inoue et al. ................. 711/163 |
| 6,108,598 A | * | 8/2000 | Sumitani ...................... 701/29 |
| 6,182,004 B1 | * | 1/2001 | Komori ...................... 701/114 |

FOREIGN PATENT DOCUMENTS

| | | |
|---|---|---|
| JP | 7-64795 | 3/1995 |
| JP | 8-227359 | 9/1996 |
| JP | 8-255084 | 10/1996 |

* cited by examiner

Primary Examiner—Nadeem Iqbal
(74) Attorney, Agent, or Firm—Finnegan, Henderson, Farabow, Garrett & Dunner, L.L.P.

(57) ABSTRACT

A computer system in which an EEPROM incorporated in a power supply control microcomputer can be compulsorily rewritten even in case contents of the EEPROM are destroyed so that a correct power supply control cannot be effected. The EEPROM is divided into two types of blocks, that is, code blocks which are objects to be rewritten and store a power supply control program and boot blocks which are not objects to be rewritten and store a power turn-on program, a key input detection program, and a rewrite request program. When the turn-on or reset of power in the system is effected, the key input detection program stored in the boot blocks is executed to detect the absence or presence of a predetermined key input. If the predetermined key input is detected, then the rewrite request program stored in the boot blocks is executed to rewrite the code blocks. Therefore, even in case the contents of the code blocks are destroyed and, thus, the correct control over the power supply cannot be executed, the rewrite of the code blocks can be compulsorily executed.

19 Claims, 7 Drawing Sheets

ERASE BLOCK DESIGNATION REGISTER

| 7 | 6 | 5 | 4 | 3 | 2 | 1 | 0 |
|---|---|---|---|---|---|---|---|
| — | — | — | EB4 | EB3 | EB2 | EB1 | EB0 |

FIG. 3A

| REGISTER | ADDRESS |
|---|---|
| EB0 | 0000–03FFh |
| EB1 | 0400–07FFh |
| EB2 | 0800–0BFFh |
| EB3 | 0C00–0FFFh |
| EB4 | 1000–7FFFh |

FIG. 3B

PROGRAM/ERASE CONTROL REGISTER

| 7 | 6 | 5 | 4 | 3 | 2 | 1 | 0 |
|---|---|---|---|---|---|---|---|
| — | — | — | — | — | — | E | P |

FIG. 4A

| REGISTER | CONTENTS |
|---|---|
| P (PROGRAM BIT) | 1:START PROGRAMMING<br>0:STOP PROGRAMMING |
| E (ERASE BIT) | 1:START ERASING<br>0:STOP ERASING |

FIG. 4B

SYSTEM STATUS REGISTER

| 7 | 6 | 5 | 4 | 3 | 2 | 1 | 0 |
|---|---|---|---|---|---|---|---|
| FLWRQ | — | — | — | — | — | — | — |

FIG. 5A

| REGISTER | CONTENTS |
|---|---|
| FLWRQ (PROGRAM REQUEST) | 1:OPERATE UNDER PROGRAM IN BOOT BLOCK (PROGRAM REQUEST)<br>0:OPERATE UNDER PROGRAM IN CODE BLOCK |

FIG. 5B

DATA REGISTER

| 7 | 6 | 5 | 4 | 3 | 2 | 1 | 0 |
|---|---|---|---|---|---|---|---|
| D7 | D6 | D5 | D4 | D3 | D2 | D1 | D0 |

FIG. 6A

| REGISTER | CONTENTS |
|---|---|
| D0 | DATA |
| D1 | DATA |
| D2 | DATA |
| D3 | DATA |
| D4 | DATA |
| D5 | DATA |
| D6 | DATA |
| D7 | DATA |

COMPUTER SYSTEM AND PROGRAM REWRITING METHOD

BACKGROUND OF THE INVENTION

The present invention relates to a computer system comprising a microcomputer which incorporates a rewritable non-volatile memory storing a power supply control program therein and a method of rewriting the programs of the above-mentioned system.

The present application is based on Japanese Patent application No. 10-172983, filed on Jun. 19, 1998, the contents of which are incorporated herein for reference.

Recently, various types of personal computers known as desktop type, notebook type, etc. are developed. The control of the power supply in the system of each of these personal computers such as, for example, the connection of a notebook personal computer and a docking station for expanding the function of the personal computers is, for the most part, taken care of by a power supply control microcomputer constituted in the form of one chip in which a ROM (read only memory) storing a power supply control program therein is incorporated.

Most recently, as an EEPROM (electrically erasable and programmable ROM) known as a flash memory in which the stored data can be rewritten with a block as a unit have come to be lowered in price, the application of this EEPROM to various microcomputers has come be examined. In this connection, it is considered to apply the EEPROM also to a power supply control microcomputer. If the EEPROM is applied, then merits such as the following merit can be obtained. That is, even in case, after the EEPROM is mounted on a printed circuit board of the microcomputer, the contents (program) thereof are destroyed or even in case, as the structure of the system is changed, the contents thereof are to be put to version-up, it is ensured that, only by rewriting the data of the EEPROM, the purpose can be achieved without replacing the microcomputer itself.

By the way, in a case such as the case where a bug exists in the program of the EEPROM or the case where the program is upgraded, the EEPROM needs to be rewritten. This rewrite processing is executed by starting the rewrite program stored in, for example, a BIOS-ROM or the rewrite program loaded in the system memory through a floppy disk or an internet, etc. from outside. Therefore, unless this rewrite program is in an operable state, the rewrite processing cannot be executed. Therefore, in case some trouble or other exists in the power supply control program stored in the EEPROM incorporated in the power supply control microcomputer, so that the power supply control in the system cannot be effected correctly, and thus, the power supply of the system is not turned on, it is not possible to operate the write program. After all, the power supply control microcomputer itself must be replaced, this being a drawback.

BRIEF SUMMARY OF THE INVENTION

Accordingly, it is an object of the present invention to provide a computer system in which a power supply control program is stored in an EEPROM, wherein the rewrite of the EEPROM can be executed even in case a part of the power supply control program is destroyed, as a result of which an appropriate power supply control cannot be effected, and thus, the rewrite program cannot be started.

A related object of the present invention is to provide a method of rewriting the above EEPROM.

According to the present invention, there is provided a computer system comprising an EEPROM including a first memory region which stores a power supply control program for executing the power supply control of the computer system, and a second memory region which stores a power turn-on program for executing the turn-on of power in the system, a key input detection program for detecting a predetermined key input, and a rewrite request program for requesting the system for rewriting the contents of the first memory region; a key input detector for executing the key input detection program when the power supply in the system is turned on or reset; a power supply controller for effecting the power supply control of the system based on the power supply control program and the power turn-on program when a predetermined key input is not detected by the key input detector; and a rewrite circuit for rewriting the contents of the first memory region based on the rewrite request program when the predetermined key input is detected by the key input detector.

In the computer system according to the present invention, the second memory region is not an object to be rewritten, so that the minimum of programs necessary for the rewrite of the EEPROM and stored in the second memory region, such as the power turn-on program for executing the turn-on of power in the system, the key input detection program for detecting whether or not a predetermined key input is present, and a rewrite request program for requesting the system for rewriting the contents of the first memory region, operate without fail. Even in case the power supply control program stored in the first memory region does not correctly operate, it is possible to start the rewrite program. Further, the minimum of programs necessary for the rewrite of the EEPROM can be prevented from being damaged in case, during the rewrite processing, some abnormality or other has taken place.

In the computer system according to the present invention, the key input detection program is first executed in response to the turn-on or reset of power in the system. As a result of the execution of this key input detection program, the absence or presence of a predetermined key input indicating the rewrite of the contents of the first memory region is detected, and, in case no predetermined key input is present, the power supply control program and the power turn-on program are executed, so that the control of power supply in the system is effected. On the other hand, in case a predetermined key input is present, the rewrite request program is executed, whereby the rewrite of the contents of the first memory region is requested to the system.

In this way, by inputting a predetermined key, the rewrite program is forced to be executed, so that, even in the state in which the contents of the first memory region are destroyed and, thus, the control of power supply in the system cannot be correctly carried out or even in the state in which the version-up of the contents of the above-mentioned contents must be made, it becomes possible to execute, on the board, the rewrite of the contents of the first memory region mentioned above.

Further, the computer system according to the present invention comprises an EEPROM including a first memory region which stored a power supply control program for executing the control of power supply in the computer system and a second memory region which stores a power turn-on program for executing the turn-on of power in the system, a memory check program for checking the contents of the first memory region, and a rewrite request program for requesting the system for rewriting the contents of the first memory region; memory check means for determining the truth of the contents of the first memory region based on the memory check program when power is turned on or reset in the system; power supply control means for executing the control of power supply in the system based on the power supply control program and the power turn-on program when the truth of the contents of the first memory region is affirmed by the memory check means; and rewrite means for rewriting the contents of the first memory region based on the rewrite request program when the truth of the contents of the first memory region is denied by the memory check means.

In this way, the memory check program is first executed in response to the turn-on or reset of power in the system. Through the execution of this memory check program, the truth of the contents of the first memory region is determined. In case the truth is affirmed, the power supply control program and the power turn-on program are executed to perform the control of power supply in the system. On the other hand, in case the truth is denied, the rewrite request program is executed, so that the rewrite of the contents of the first memory region is requested to the system.

Therefore, in case the contents of the first memory region are destroyed, the rewrite program is executed before the utilization thereof, so that the runaway of the system is never caused; and thus, the restoration of the contents of the first memory region thereof is quickly executed.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a computer system according to the present invention will now be described with reference to the accompanying drawings.

Figure 1:
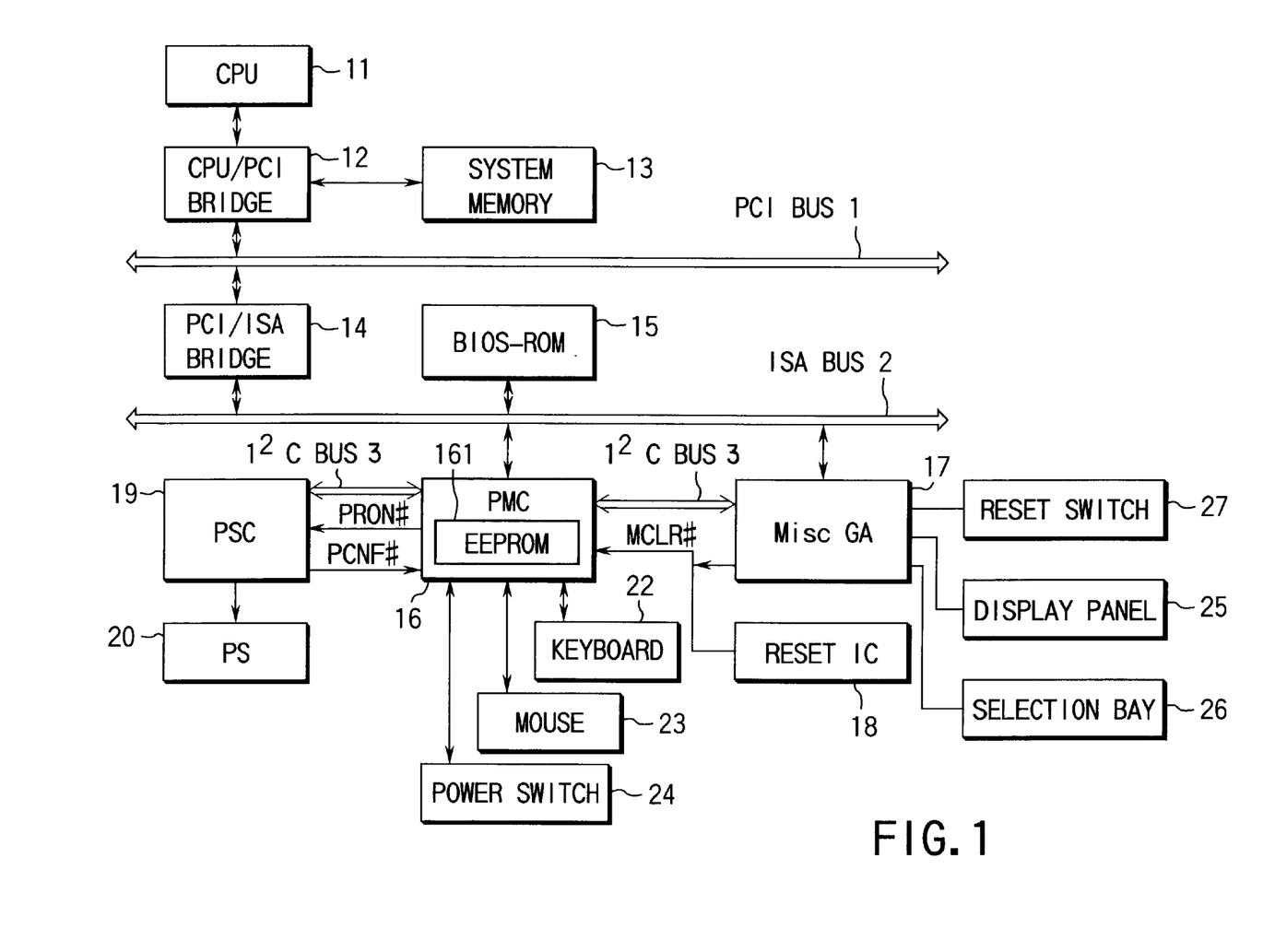
FIG. 1 is a block diagram showing the structure of an embodiment of the computer system according to the present invention.

FIG. 1 shows the structure of the computer system according to an embodiment of the present invention. The computer system is a notebook type personal computer, on the system board of which there are provided a PCI bus 1, an ISA bus 2 and a $I^2C$ bus 3. In this case, however, the computer system may alternatively be a desk top type.

Provided in the interior of the computer system are a CPU 11, a CPU/PCI bridge 12, a system memory 13, a PCI/ISA bridge 14, a BIOS-ROM 15, a power supply control microcomputer (PMC) 16, a Misc GA 17, a reset IC 18, a power supply controller (PSC) 19, a power supply circuit (PS) 20, etc.

The CPU 11 executes an application program including an operating system, a device driver, and a utility stored in the system memory 13, etc.

The CPU/PCI bridge 12 is a bride LSI which connects a local bus of the CPU 11 and the PCI bus 1 to each other, operates as one of the bus masters of the PCI bus 1, and possesses functions such as the function of converting the bus cycle bi-directionally and the function of access-controlling the system memory 13 through a memory bus.

The system memory 13 is a memory device which acts as the main memory in the computer system and which stores an application program including an operating system, a device driver and a utility which are execution-controlled by the CPU 11, a processing data, etc.

The PCI/ISA bridge 14 is a bridge LSI, which connects the PCI bus 1 and an ISA bus 2 to each other and operates as one of the PCI devices, and in which there are incorporated a PCI bus arbiter, a DMA controller, etc. The BIOS-ROM 15, the power supply control microcomputer 16, and the Misc GA 17, etc. are connected to the ISA bus 2.

The BIOS-ROM 15 is a memory device which stores a basic input/output system (abbreviated to BIOS). Stored in the BIOS-ROM 15 is a rewrite program for rewriting the contents (the power supply control program etc.) of an EEPROM (flash memory) 161 incorporated in the power supply control microcomputer 16 which will be described later. In this case, the data to be rewritten is supplied from outside. As for the way of supplying the above-mentioned data, it may be performed by way of a floppy disk or through communications in the internet or the like. Further, the rewrite program may be supplied from outside each time in place of storing it in the BIOS-ROM 15.

The power supply control microcomputer 16 is a one-chip microcomputer which possesses the function of controlling a mouse 23 and a keyboard 22 and the function of controlling the power supply, and various programs are incorporated in the electrically rewritable non-volatile memory EEPROM 161. The power supply control microcomputer 16 also monitors a power supply switch 24, and, when depressed, the power supply switch 24 activates a PRON# signal to request the power supply controller 19 for ON/Off-switching the power in the system.

The Misc GA 17 is a gate array for detecting the various statuses of the computer system and possesses the function of detecting the depressed state of the reset switch 18, the opened/closed state of a display panel 25 comprising an LCD, and the state in which the PC cards are mounted in a selection bay 26. The Misc GA 17 activates an MCLR# signal to inform the reset to the power supply control microcomputer 16 when a reset switch 27 is depressed for more than 10 seconds or when the mounted state in the selection bay 26 is changed in the state in which a display panel 25 is closed and the reset switch 27 is depressed. The MCLR# signal is informed to the power supply control microcomputer 16 from the reset IC 18 also when the voltage value of the power supplied to the power supply control microcomputer 16 has fallen below a predetermined value.

The power supply controller 19 controls the power supply circuit 20 and exchanges data with the power supply control microcomputer 16 through the I²C bus 3 and also informs the power supply control microcomputer 16, through a PCNF# signal, of whether the power supply of the system is in ON state or not.

Figure 2:
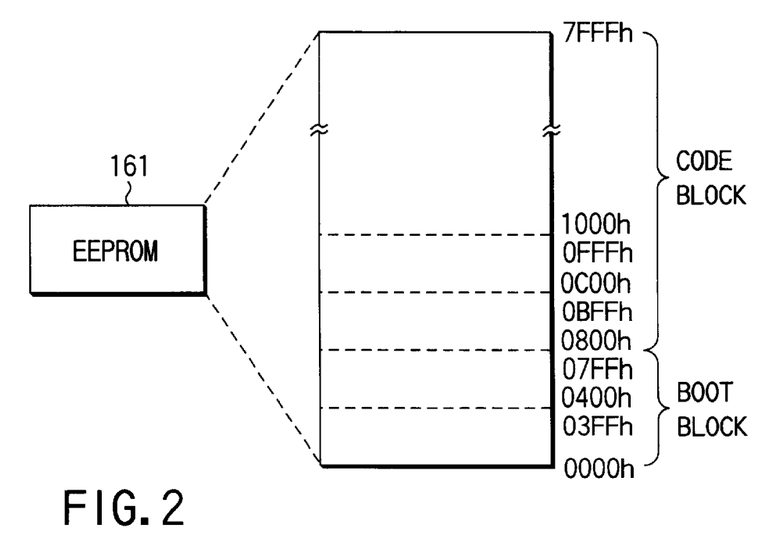
FIG. 2 is a schematic diagram showing the address space of the EEPROM incorporated in the power supply control microcomputer shown in FIG. 1.

FIG. 2 shows the address space of the EEPROM 161 incorporated in the power supply control microcomputer 16.

The physical addresses of the EEPROM 161 range from 0000h to 7FFFh. Addresses ranging from 0000h to 0FFFh are divided into four blocks by every 0400h. Addresses ranging from 1000h to 7FFFh are grouped as one block. The rewrite processing is performed with a block as a unit. The block consisting of the physical addresses, 0000h to 03FFh, and the block consisting of the physical addresses, 0400h to 07FFh, are set as un-rewritable boot blocks. A rewrite of these boot blocks are inhibited by a software. The block consisting of the physical addresses, 0800h to 0BFFh, the block consisting of the physical addresses, 0C00h to 0FFFh, and the block consisting of the physical addresses, 1000h to 7FFFh are set as rewritable code blocks. According to the present invention, the EEPROM 161 in the power supply microcomputer 16 is divided into un-rewritable boot blocks and rewritable code blocks which are objects to be rewritten; and the minimum of programs necessary for the rewrite, such as a power turn-on program for executing the turn-on of power in the system, a communication program for executing the communications with the system, and a rewrite request program for requesting the system for rewriting the contents of the code blocks, are stored in the boot blocks, while the other power supply control program is stored in the code blocks.

By concentrating only the minimum number of functions necessary for the rewrite of the EEPROM 161 in the boot blocks as stated above, the quality of these programs is enhanced, at the same time, by setting the boot blocks as those which are not to be rewritten, it is possible to prevent these programs from being damaged in case some abnormality or other has taken place during the rewrite processing.

The power supply control microcomputer 16 according to this embodiment includes a group of registers each comprising 8-bits, that is, an erase block designation register, a program/erase control register, a system status register and a data register. This group of registers will be described below by reference to FIGS. 3A to 6B.

Figure 3A:
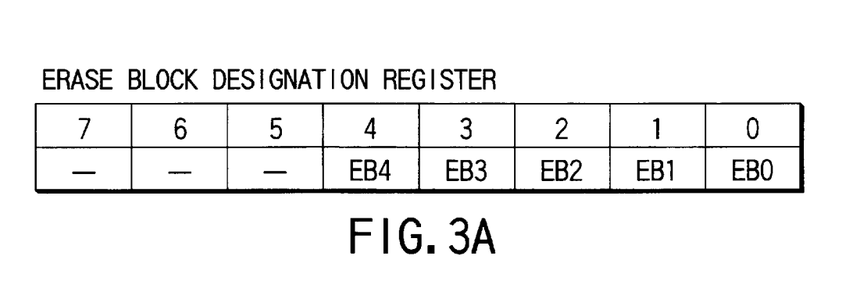
FIG. 3A and FIG. 3B are schematic diagrams showing the structure of the erase block designation register provided in the power supply control microcomputer shown in FIG. 1.
Figure 3B:
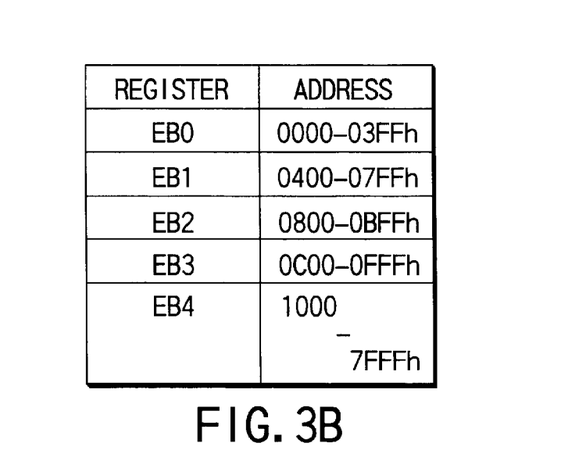

FIG. 3A and FIG. 3B are schematic diagrams showing the structure of the erase block designation register.

The erase block designation register is a register for setting, by blocks, the erase areas of the EEPROM 161 incorporated in the power supply control micro-computer 16, wherein, as shown in FIG. 3A, the bit 0 (EB0) to bit 4 (EB4) are used; and the blocks corresponding to the respective registers in which "1" is set become objects to be erased. The relationship between the registers EB0 to EB4 and the block areas is shown in FIG. 3B. For example, in case "1" is set in the register EB2, the block consisting of the physical addresses, 0800h to 0BFFh, becomes an object to be erased, and, in case "1" is set in the register EB4, the block consisting of the physical addresses, 1000h to 7FFFh, becomes an object to be erased. In this case, the blocks consisting of the physical addresses, 0000h to 07FFh, are the boot blocks, so that it is inhibited to set "1" in the registers EB0 and EB1 by a software.

Figure 4A:
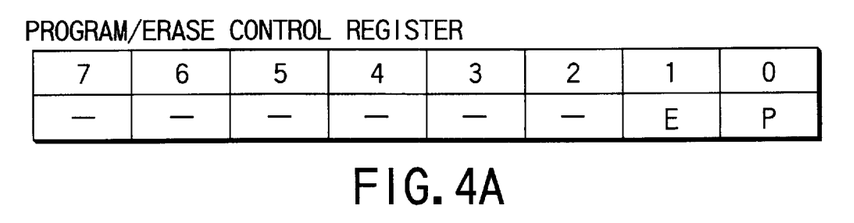
FIG. 4A and FIG. 4B are schematic diagrams showing the structure of the program/erase control register provided in the power supply control microcomputer shown in FIG. 1.
Figure 4B:
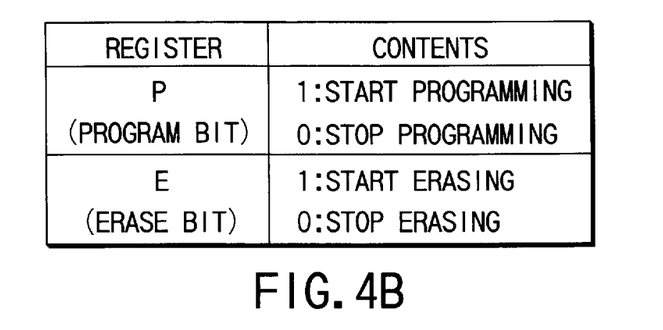

FIG. 4A and FIG. 4B are schematic diagrams showing the structure of the program/erase control register.

The program/erase control register is a register for controlling the erase and program of the EEPROM 161 incorporated in the power supply control microcomputer 16, wherein, as shown in FIG. 4A, the bit 0 (Register P) and the bit 1 (Register E) are used. As shown in FIG. 4B, the register P is related to programming, while the register E is related to erasing; if "1" is set in the register P, then the start of programming is indicated, while, if "0" is set, then the stop of programming is indicated. If "1" is set in the register E, then the start of erasing is indicated, while, if "0" is set, then the stop of erasing is indicated.

Figure 5A:
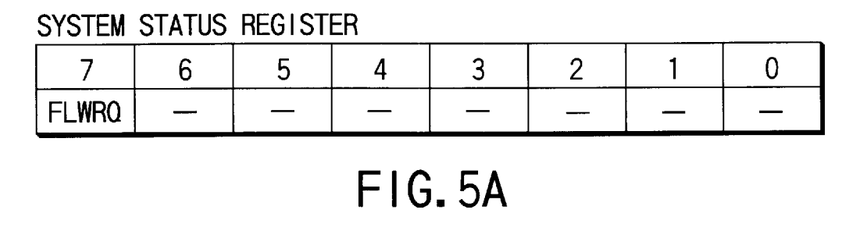
FIG. 5A and FIG. 5B are schematic diagrams showing the structure of the system status register provided in the power supply control microcomputer shown in FIG. 1.
Figure 5B:
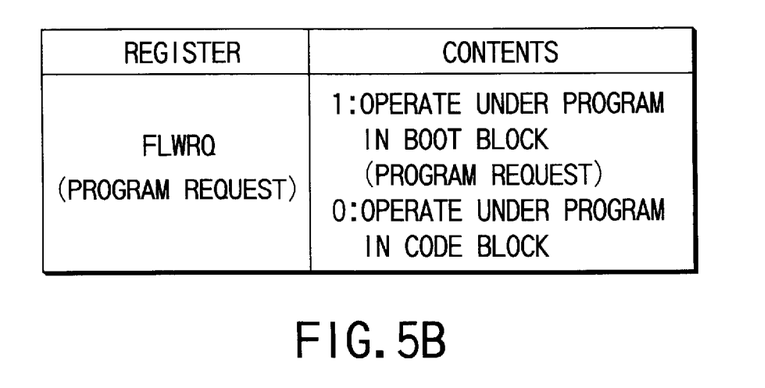

FIG. 5A and FIG. 5B are schematic diagrams showing the structure of the system status registers.

The system status register is a register which is readable through the ISA bus 2 from the CPU 11, wherein, as shown in FIG. 5A, only the bit 7 (Register FLWRQ) is used. As shown in FIG. 5B, if "1" is set in the register FLWRQ, then it is indicated that the power supply microcomputer is operating based on the program in the boot blocks, i.e., requesting for a rewrite processing, while, if "0" is set, then it is indicated that the power supply control microcomputer 16 is operating based on the program in the code blocks, i.e., executing a power control operation.

Figure 6A:
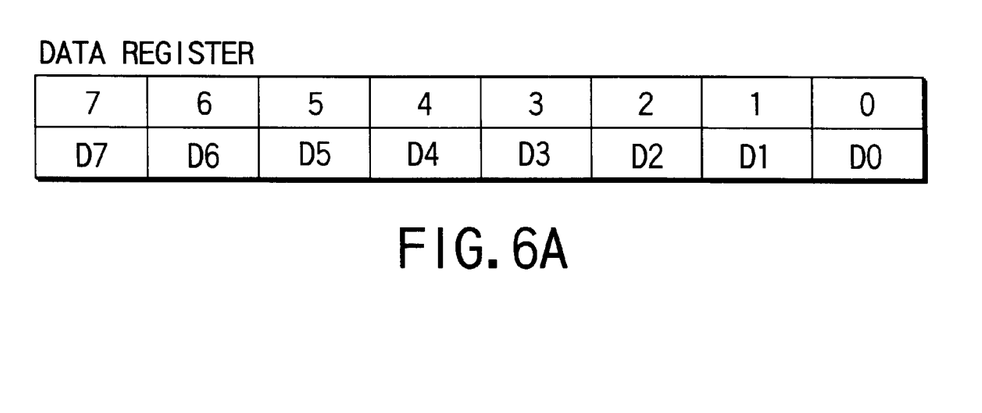
FIG. 6A and FIG. 6B are schematic diagrams showing the structure of the data register provided in the power supply control microcomputer shown in FIG. 1.
Figure 6B:
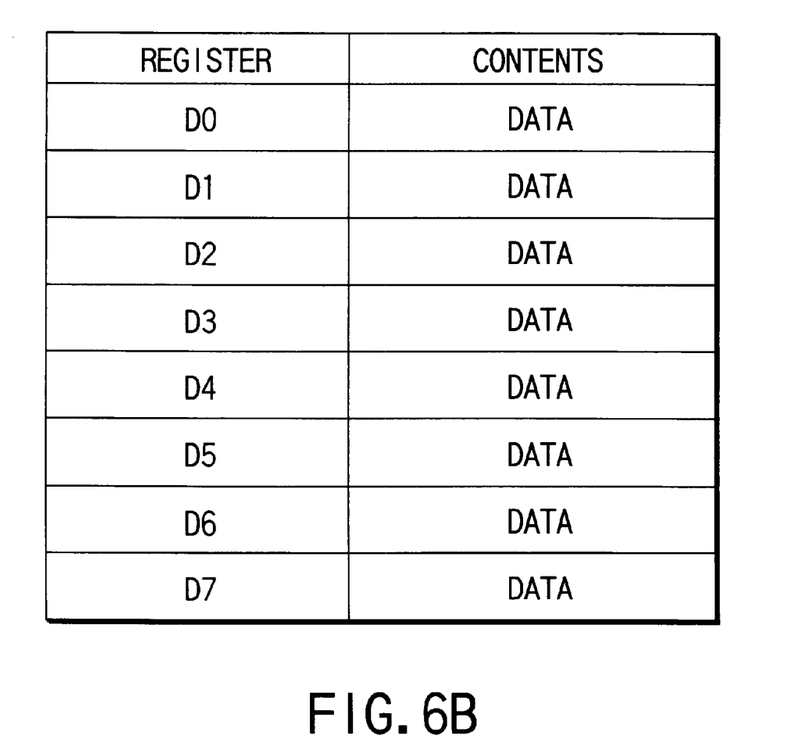

FIG. 6A and FIG. 6B are schematic diagrams showing the structure of the data register.

The data register is a register which is readable and programmable through the ISA bus 2 form the CPU 11, wherein all of the bit 0 (Register D0) to the bit 7 (Register D7) are used as shown in FIG. 6A. As shown in FIG. 6B, the registers D0 to D7 store therein the data communicated with the CPU 11. Further, if, when the power supply control microcomputer 16 is in its normal operation, data is written in this data register from the CPU 11, then an internal interrupt takes place within the power supply control microcomputer 16.

Figure 7:
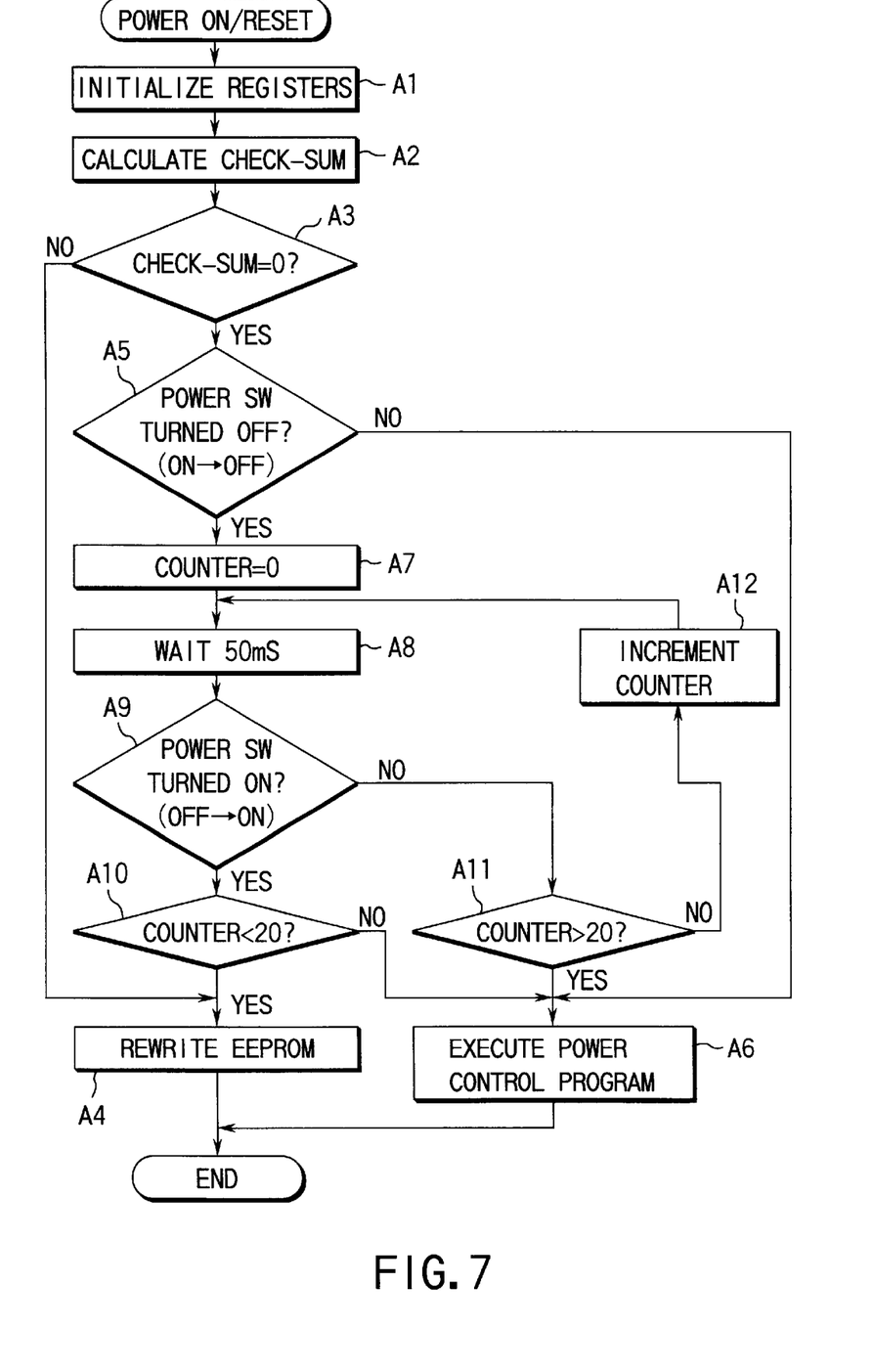
FIG. 7 is a flow chart for explaining the operation procedure of the power supply control microcomputer shown in FIG. 1.
Figure 8:
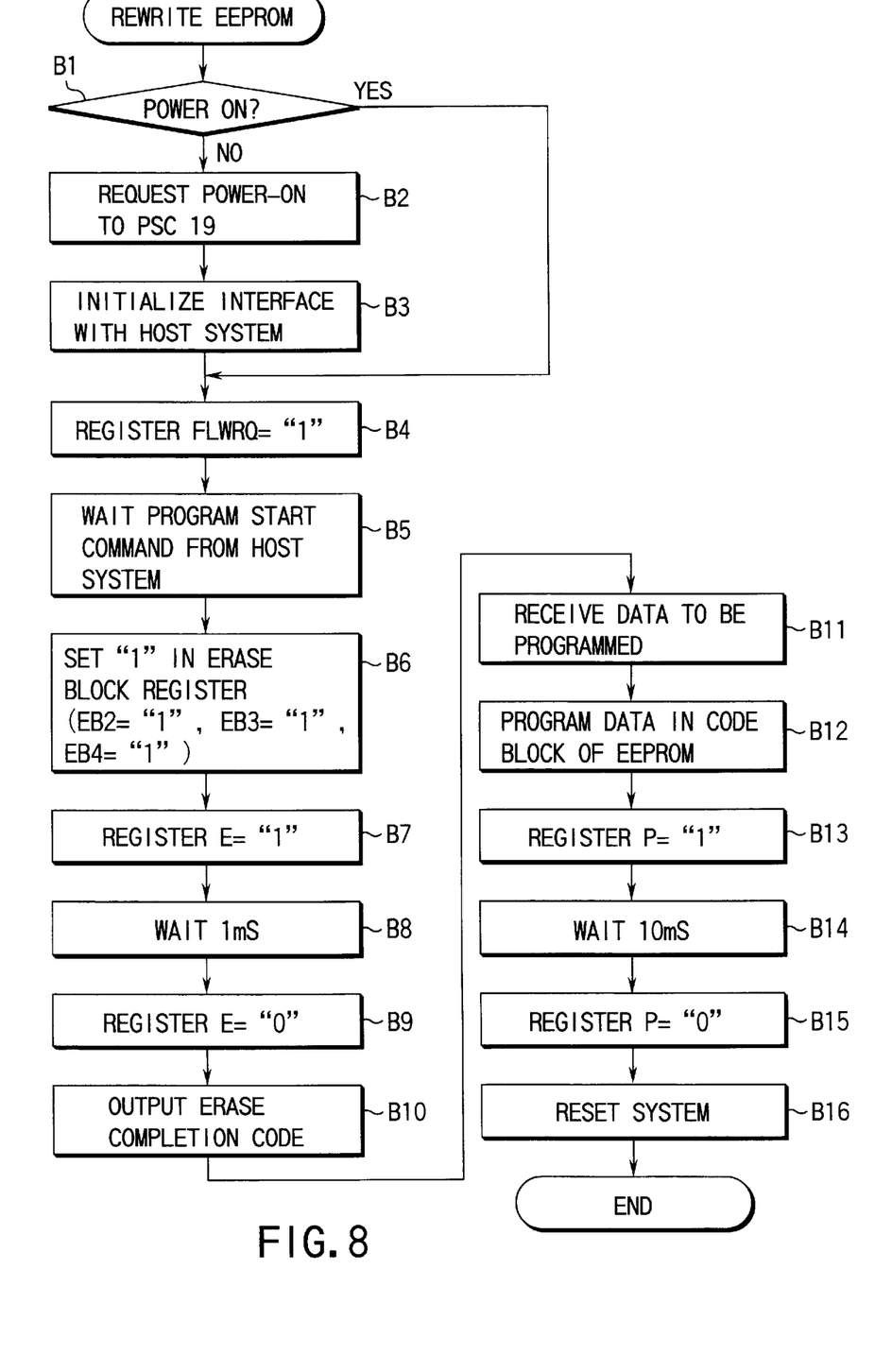
FIG. 8 is a flow chart for explaining the operation procedure executed for the rewrite processing of the EEPROM in the power supply control microcomputer.

Next, referring to the flow charts shown in FIGS. 7 to 9, the operation procedure of the power supply control microcomputer 16 will be described below.

The power supply control microcomputer 16 operates in accordance with the group of programs stored in the boot blocks of the EEPROM 161 incorporated in the power supply control microprocessor 16, immediately after the turn-on or reset of power in the system. By the "turn-on of power in the system" mentioned here, not only the point of time when the power supply switch 24 is depressed (to change off state to on state) but also the point of time when the power feed itself to the system is started or re-started, e.g., when the battery pack is mounted, is meant. Further, the reset of the power supply control microcomputer 16 is caused when the reset switch is depressed for more than 10 seconds or when the mounted state in the selection bay has changed in the state in which the panel is closed and the reset switch is depressed.

The power supply control microcomputer 16 first initializes the group of registers shown in FIGS. 3A, 4A, 5A and 6A (step A1). Upon completion of the initialization, the power supply control microcomputer 16 determines whether the contents of the EEPROM 161 is true or false (step A2). This determination is executed by the use of a method such as, for example, the method according to which the contents of the EEPROM 161 are all added up with a byte as unit, and, if the value thus obtained is "0", then the truth of the contents is affirmed (check-sum test).

If, as a result of this check, the truth of the contents of the EEPROM 16 is denied (No at step A3), then the power supply control microcomputer 16 executes the rewrite processing of the EEPROM which will be described later (step A4). By so doing, it is ensured that, even in case, for example, the power feed was cut off during the previous rewrite processing to destroy the contents of the code blocks, the rewrite processing is compulsorily executed before the utilization thereof, so that the system is not allowed to runaway, and thus, the restoration of the code blocks can be quickly carried out.

On the other hand, if the truth of the contents of the EEPROM 161 is affirmed (Yes at step A3), then the power supply control microcomputer 16 determines, this time, whether or not a predetermined key input requesting the EEPROM to rewrite the EEPROM is present. Here, by the "predetermined key input requesting to rewrite", the fact that, during the period till the operation shifts to the normal operation, the power supply switch 24 is depressed two more times (Power On→Power Off→Power On) is meant.

Thus, the power supply control microcomputer 16 first determines whether or not the power supply switch 24 is depressed (step A5) and execute its normal processing (step A6) in case the power supply switch 24 is not depressed (No at step A5). The "normal processing" mentioned above refers to a processing performed in accordance with the power supply control program stored in the code blocks of the EEPROM 161. On the other hand, in case the power supply switch 24 is depressed (Yes at step A5), the operation of the power supply control microcomputer 16 shifts to the operation of determining whether the power supply switch 24 is depressed again within one second. That is, the counter is reset at step A7, the processing of a waiting time of 50 ms is executed at step A8, it is determined at step A9 whether or not the power supply switch 24 is changed from OFF state to ON state, and, at step 10, it is determined whether or not the count value is less than 20. In case the power supply switch 24 has been depressed again within one second (the case of step A10), a rewrite processing is executed (step A4), while, in case the power supply switch 24 has not been depressed again within one second (No at step A10), the power supply control program stored in the code blocks is started to execute the normal power supply control processing (step A6).

Therefore, in case, for example, the contents of the EEPROM 161 is to be compulsorily rewritten, the reset switch 27 is depressed for more than 10 seconds or the packaged state in the selection bay is changed in the state in which the display panel is closed with the reset switch depressed, and then the power supply control microcomputer 16 is informed of the reset. Immediately after informing of the reset, the power supply switch 24 is depressed twice within one second, whereby it becomes possible to intentionally execute a rewrite processing.

Next, the operation procedure of the power supply control microcomputer 16 when a rewrite processing is executed will be described by reference to FIG. 8. Here, it is to be noted that, when a rewrite processing is executed, the power supply control microcomputer 16 operates in accordance with the group of programs stored in the boot blocks of the EEPROM 161 incorporated in the power supply control microcomputer 16.

In case of carrying out a rewrite processing, the power supply control microcomputer 16 first determines whether the power supply in the system is in ON state or not (step B1), so that, when the power supply in the system is in OFF state (No at step B1), the power supply control microcomputer 16 requests the power supply controller 19 for turning on the power of the system (step B2) and initializes the interface circuit with the system (step B3).

Next, the power supply control microcomputer 16 sets "1" in the system status register FLWRQ and informs the system side of the fact that the power supply control microcomputer 16 requests a rewrite processing of the EEPROM to the system side (step B4). In this case, the power supply control microcomputer 16 waits until it receives a rewrite start command from the system side (step B5).

On the other hand, when the system side recognizes that the power supply control microcomputer 16 has requested a rewrite processing, the rewrite program stored in the BIOS-ROM 15 is executed at the system side. Thus, the rewrite program writes a rewrite start command into the data register. Further, when the power supply control microcomputer 16 recognizes that the rewrite start command has been written into the data register, the power supply control microcomputer 16 executes an erasure (flash erasure) processing.

In the flash erasure processing, the power supply control microcomputer 16 stores "1" in the erase block register EB. In this case, "0" is stored in the registers EB0 and EB1 in order not to erase the boot blocks, and "1" is stored in the registers EB2 to EB4 (step B6). Then, the power supply control micro-computer 16 executes the erase processing by the use of the register P of the program/erase control register (steps B7 to B9), the power supply control micro-computer 16 outputs an erase completion code to the system side (step B10).

When the system side receives the erase completion code, the rewrite program (in the BIOS-ROM) starts to transmit data to be written into the code blocks of the EEPROM 161. This data is data which has been supplied from a floppy disk, an internet or the like. On the other hand, upon receipt of data to be written (step B11), the power supply control microcomputer 16 writes the write data into the concerned region of the EEPROM 161 (step B12). Thereafter, sets "1" in the register P of the program/erase control register (step B13) and sets "0" further after about 10 ms (step B14 to step B15). By this processing, the received data to be written is written into the EEPROM 161.

Further, upon completion of the processing of rewrite into the EEPROM 161, the power supply control microcomputer 16 generates a reset by utilizing a watch dog timer function which it possesses itself (step B16). Due to the generation of the reset, the processing explained by the flow chart shown in FIG. 7 is restarted with the contents after rewrite. That is, if the result of the check-sum exhibits truth, and a predetermined key manipulation requesting a rewrite is not performed, then the power supply control program is started to execute a normal power supply control.

Figure 9:
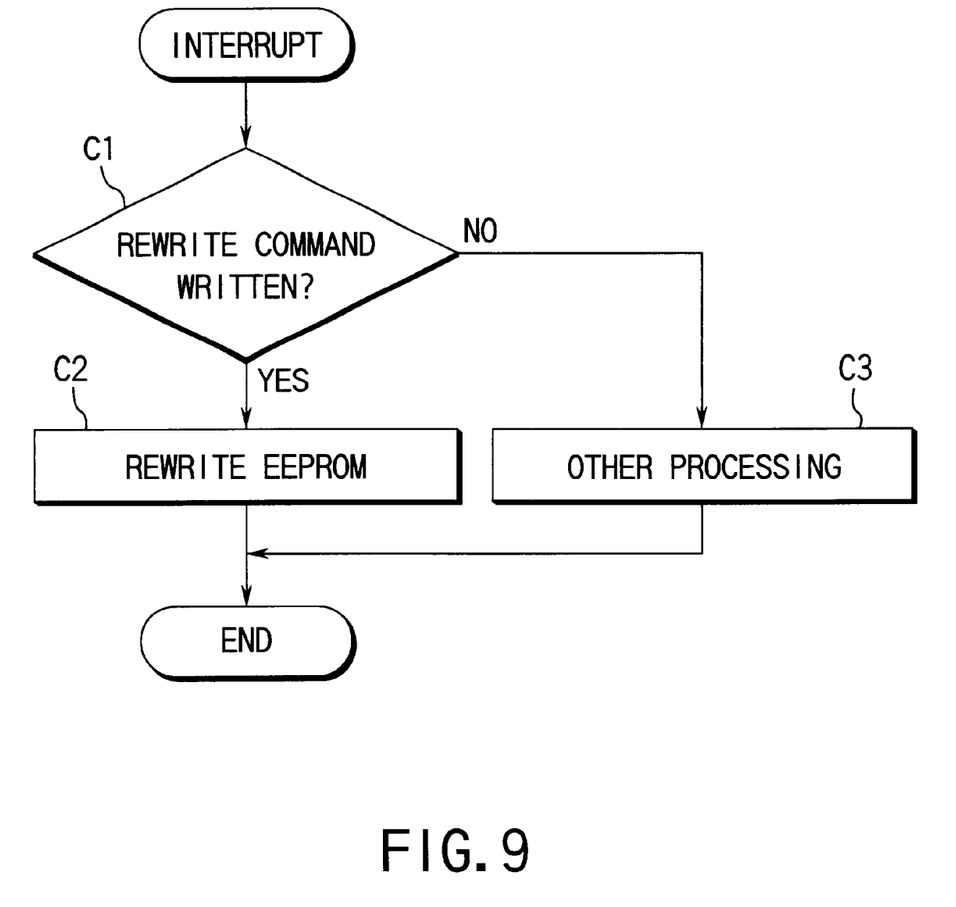
FIG. 9 is a flow chart showing the operation procedure performed for the command interrupt processing of the power supply control microcomputer.

FIG. 9 is a flow chart showing the operation procedure executed when the power supply control microcomputer 19 performs a command interrupt processing.

When data is written into the data register from the system during the normal operation as mentioned above, an internal interrupt is produced in the power supply control microcomputer 16. Further, in case the data written into the data register is an EEPROM rewrite command (Yes at step C1), the power supply control microcomputer 16 executes the EEPROM rewrite processing mentioned above (step C2). This is for executing an EEPROM rewrite processing by a command even during the normal operation, whereby the starting of the EEPROM rewrite processing by a utility program becomes possible.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the foregoing embodiment has been described, referring to an EEPROM which has a power supply control program stored therein, but the present invention relates to the rewrite of general programs of an EEPROM, and thus, no limitation at all is placed on the programs which are objects to be rewritten. That is, in the case of the present invention, it is sufficient if only the minimum necessary programs which can start a rewrite program are stored in the EEPROM in an un-rewritable state. Further, it is not necessary to store the boot block in the EEPROM. The boot block may be stored in a mask ROM.

As has been described in detail above, according to the present invention, only the minimum of programs necessary for the rewrite of programs are concentratively stored in one of the memory regions resulting from dividing the EEPROM into two, whereby the quality of these programs can be enhanced. If this memory region is set so as not to be an object to be rewritten by the rewrite program, even in cases some abnormality or other has taken place during a rewrite processing, these programs can be prevented from being damaged.

Further, the rewrite program can be compulsorily executed by inputting a predetermined key, so that, even under such circumstances that the contents of the EEPROM are destroyed and, thus, the power supply control in the system cannot be correctly carried out or that the contents thereof must be put to version-up, the rewrite of the contents thereof can be executed on the board.

Further, in case the truth of the contents of the EEPROM is denied as a result of checking the contents mentioned above, the rewrite program is automatically executed, so that the system is never allowed to run away, and thus, the restoration required can be quickly executed.

Further, also by an internal interrupt, the rewrite program can be executed, so that the starting of the rewrite processing of the EEPROM by the utility program can also be effected.

What is claimed is:

1. A computer system comprising:
an electrically erasable programmable ROM including a first memory region which stores a power supply control program for executing a control of a power supply, and a second memory region which stores a power turn-on program for executing a turn-on of the power supply, a condition detecting program for detecting a predetermined condition, and a rewrite request program which requests the system for rewrite of contents of said first memory region; and
a rewrite control circuit which executes the rewrite of the contents of said first memory region based on said rewrite request program when said condition detecting program detects the predetermined condition.

2. The computer system according to claim 1, in which said condition detecting program determines whether or not data stored in the second memory region is true or false after a turn-on of the power supply or after a reset of the power supply; and
said rewrite control circuit executes the rewrite when said condition detecting program determines that data stored in the second memory region is false.

3. The computer system according to claim 2, in which said condition detecting program determines whether or not a check-sum of the data in said second memory region is 0, and
said rewrite control circuit executes the rewrite when said check-sum is not 0.

4. The computer system according to claim 1, in which said condition detecting program determines whether or not a predetermined key manipulation is carried out after a turn-on of the power supply or after a reset of the power supply, and
said rewrite control circuit executes the rewrite when said predetermined key manipulation has been carried out.

5. The computer system according to claim 4, in which, said predetermined key operation includes an operation in which a power turn-on key is manipulated twice within a predetermined time after the turn-on of the power supply or after the reset of the power supply.

6. The computer system according to claim 1, in which said condition detecting program determines whether or not an internal interrupt based on a command indicating a rewrite has been produced after a turn-on of the power supply or after the reset of the power supply, and
said rewrite control circuit executes the rewrite when said internal interrupt has been produced.

7. The computer system according to claim 1, further comprising:
a power supply controller which executes control over the power supply in the system based on said power supply control program when said condition detecting program does not detect the predetermined condition after the turn-on of the power supply or the rest of the power supply.

8. The computer system according to claim 1, further comprising:
a basic input/output system including a rewrite program for the rewrite of said ROM.

9. The computer system according to claim 1, in which said second memory region is not rewritable.

10. A method of rewriting an electrically erasable programmable ROM which includes a first memory region which stores a power supply control program for executing a control of a power supply, and a second memory region which stores a power turn-on program for executing a turn-on of the power supply, a condition detecting program for detecting a predetermined condition, and a rewrite request program which requests the system for a rewrite of contents of said first memory region, comprising:
starting said condition detecting program after the turn-on of the power supply or after the reset of the power supply; and
rewriting the contents of said first memory region based on said rewrite request program when a predetermined condition is detected.

11. The method according to claim 10, further comprising:

executing control over the power supply in the system based on said power supply control program when said condition detecting program cannot detect the predetermined condition.

12. The method according to claim 10, in which said predetermined condition includes a condition in which after the turn-on of the power supply or after the reset of the power supply, a false of the data in the second memory region is detected.

13. The method according to claim 10, in which said predetermined condition includes a condition in which a predetermined key manipulation is carried out.

14. The method according to claim 10, in which said predetermined condition includes a condition in which an internal interrupt based on a command indicating a rewrite is produced.

15. A storing medium readable by a computer system which includes an electrically erasable programmable ROM which stores a power supply control program, comprising:

a power turn-on program code for executing a turn-on of power;

a condition detecting program code for detecting a predetermined condition;

a rewrite request program code which requests the computer system for a rewrite of said power supply control program; and a program code which starts said rewrite request program when said predetermined condition is detected.

16. The storing medium according to claim 15, further comprising a program code for starting said power supply control program when said condition detecting program does not detect the predetermined condition.

17. The storing medium according to claim 15, in which, said condition detecting program determines whether data in said ROM is true or false after a turn-on of a power supply or after a reset of the power supply, and, when said condition detecting program determines that the data in said ROM is false, said rewriter quest program is started.

18. The storing medium according to claim 15, in which, said condition detecting program determines whether or not a predetermined key manipulation is carried out after a turn-on of a power supply or after a reset of the power supply, and, when said predetermined key manipulation is detected, said rewrite request program is started.

19. The storing medium according to claim 15, in which said condition detecting program determines whether or not an internal interrupt based on a command indicating a rewrite is produced, and, when said internal interrupt is detected, said rewrite request program is started.

* * * * *